(12) United States Patent
Kumar et al.

(10) Patent No.: US 10,031,012 B2
(45) Date of Patent: Jul. 24, 2018

(54) SYSTEM AND METHOD FOR MONITORING FLUID FLOW IN A CONDUIT

(71) Applicant: Wipro Limited, Bangalore (IN)

(72) Inventors: Vijay Kumar, Bangalore (IN); Thomas Chittakattu Ninan, Kannur District (IN); Ankita Kalra, Lucknow (IN)

(73) Assignee: WIPRO LIMITED, Bangalore (IN)

( * ) Notice: Subject to any disclaimer, the term of this patent is extended or adjusted under 35 U.S.C. 154(b) by 114 days.

(21) Appl. No.: 15/363,319

(22) Filed: Nov. 29, 2016

(65) Prior Publication Data
US 2018/0094958 A1   Apr. 5, 2018

(30) Foreign Application Priority Data
Sep. 30, 2016   (IN) .............................. 201641033596

(51) Int. Cl.
*G01F 9/00* (2006.01)
*G01F 23/00* (2006.01)
*H04N 13/02* (2006.01)
*H04N 5/247* (2006.01)
*G06T 7/00* (2017.01)

(52) U.S. Cl.
CPC .............. *G01F 9/00* (2013.01); *G01F 23/003* (2013.01); *G06T 7/0004* (2013.01); *H04N 5/247* (2013.01); *H04N 13/0203* (2013.01); *G06T 2207/30164* (2013.01)

(58) Field of Classification Search
CPC ....... G01F 9/00; G01F 23/003; G06T 7/0004; G06T 2207/30164; H04N 13/0203; H04N 5/247
See application file for complete search history.

(56) References Cited

U.S. PATENT DOCUMENTS

| 6,112,131 | A | * | 8/2000 | Ghorashi | ............. | G01N 33/362 700/142 |
| 2010/0235117 | A1 | * | 9/2010 | Melnyk | .................... | G01P 5/22 702/49 |
| 2013/0057675 | A1 | * | 3/2013 | Jaaskelainen | ............. | G01P 5/22 348/84 |

OTHER PUBLICATIONS

Hydrodynamics & Hydraulics3D stereoscopic PIV based Flow Meter for fully and partially filled conduits; Dantec Dynamics, 2000
Papadopouloset al., "Liquid Flow Measurement via 3-D PIV," Flomeko 2000: 10th International Conference on Flow Measurement, Salvador, Brazil, Jun. 4-8, 2000.*

* cited by examiner

*Primary Examiner* — Dramos I Kalapodas
(74) *Attorney, Agent, or Firm* — Finnegan, Henderson, Farabow, Garrett & Dunner, LLP

(57) ABSTRACT

This disclosure relates generally to a conduit 112 and more particularly to a system and method for monitoring fluid flow in the conduit 112.
In one embodiment, a fluid monitoring device 100 for monitoring fluid flow in a conduit 112 is disclosed. The fluid monitoring device 100 comprises a depth camera 102 placed inside the conduit 112; a conveyor belt 104 placed in contact with a surface of a fluid 114 in the conduit 112; an indicator ball 106 placed in contact with the conveyor belt 104; and two image capturing devices 108 placed inside the conduit 112, wherein each of the two image capturing devices 108 are placed at an equal distance from the depth camera 102.

13 Claims, 4 Drawing Sheets

SYSTEM AND METHOD FOR MONITORING FLUID FLOW IN A CONDUIT

TECHNICAL FIELD

This disclosure relates generally to a conduit and more particularly to a system and method for monitoring fluid flow in the conduit.

BACKGROUND

Lack of visibility within a conduit makes monitoring fluid flow a difficult task. For instance, monitoring state of sewer pipes might involve manually monitoring state of sewage waste inside the sewer. Manually monitoring fluid flow in such a manner may be a distasteful task. However, the distasteful task is unavoidable since the conduit needs to be monitored for presence of blockage. Flow rate and transferred fluid quantity may act as indicators to determine the presence of blockage in the conduit.

The flow rate and the transferred fluid quantity may act as indicators to presence of blockage because the flow rate may decrease and the transferred fluid quantity may increase in case of a blockage in the conduit. In order to avoid costly regular interruptions that might adversely affect normal operations, for instance in the industrial applications, the blockage in the conduit needs to be determined well-in advance. There is also a need for monitoring the fluid flow automatically rather than manually.

SUMMARY

In an embodiment, a fluid monitoring device is disclosed for monitoring fluid flow in a conduit. The fluid monitoring device comprising: a depth camera placed inside the conduit, wherein the conduit has a first reference axis parallel to length of the conduit; a conveyor belt placed in contact with a surface of a fluid in the conduit, wherein the conveyor belt is placed parallel to the first reference axis of the conduit, and wherein the first reference axis is perpendicular to a line that passes through a center of gravity of the depth camera and a center of gravity of the conveyor belt; an indicator ball placed in contact with the conveyor belt; and two image capturing devices placed inside the conduit, wherein the two image capturing devices are parallel to the first reference axis of the conduit, and wherein each of the two image capturing devices are placed at an equal distance from the depth camera.

In another embodiment, a method of monitoring fluid flow in the conduit is disclosed, the method comprising: determining a fluid level of a fluid in the conduit; positioning a conveyor belt in contact with a surface of the fluid based on the fluid level; conveying, an indicator ball at a rate proportional to a flow rate of the fluid; capturing, plurality of images of the indicator ball when the indicator ball is in perpendicular line of sight of each of the two image capturing devices; and monitoring the fluid flow in the conduit based on at least one of the plurality of images and the fluid level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present disclosure relates to a fluid monitoring device for monitoring fluid flow in a conduit. The fluid monitoring device comprises a depth camera placed inside the conduit. The conduit has a first reference axis that is parallel to length of the conduit. The fluid monitoring device further comprises a conveyor belt placed in contact with a surface of a fluid in the conduit The conveyor belt is placed parallel to the first reference axis of the conduit and the first reference axis is perpendicular to a line that passes through a center of gravity of the depth camera and a center of gravity of the conveyor belt. The fluid monitoring device further comprises an indicator ball placed in contact with the conveyor belt. The fluid monitoring device further comprises two image capturing devices placed inside the conduit. The two image capturing devices are parallel to the first reference axis of the conduit, and wherein each of the two image capturing devices are placed at an equal distance from the depth camera.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
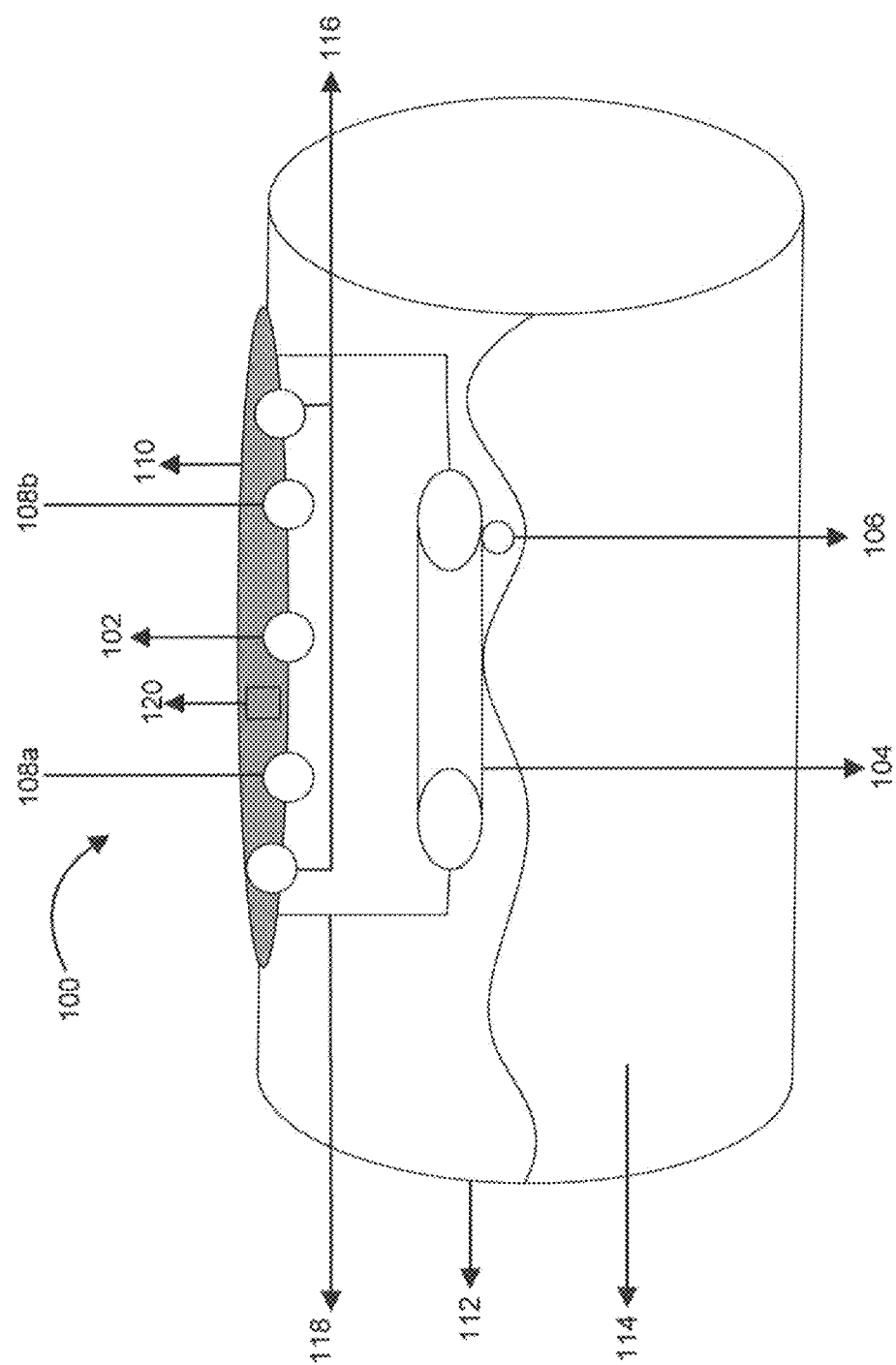
FIG. 1 is a schematic side view of a first exemplary embodiment of the arrangement of the various components of the disclosure.

FIG. 1 is a schematic side view of a first exemplary embodiment of the arrangement of the disclosure. In an implementation, a fluid monitoring device 100 comprises a depth camera 102, a conveyor belt 104, an indicator ball 106, a first image capturing device 108a and a second image capturing device 108b (The image capturing devices may be collectively numbered as 108). In one embodiment, the fluid monitoring device 100 may be attached to an inner side of a lid 110 of a conduit 112.

The depth camera 102, may provide a fluid level of a fluid 114 in the conduit 112. The depth camera 102 may first determine the distance of the lower portion of the conduit 112 from the depth camera 102, alternatively the dimensions of the conduit can be manually programmed. Further, the depth camera 102 may determine the distance of the surface of the fluid 114 from the depth camera 102. The fluid level may be determined based on the distance of the lower portion of the conduit 112 from the depth camera 102 and the distance of the surface of the fluid 114 from the depth camera 102. In one embodiment, the depth camera 102 may be used without any light source 116. In another embodiment, the depth camera 102 may be attached to the inner side of the lid 110 of the conduit 112. There may also be a first reference axis (not show in FIG. 1) that is parallel to length of the conduit 112. The first reference axis is explained in further detail in conjunction with FIG. 2.

The conveyor belt 104 comprises a belt and two or more pulleys. The belt may be attached in a loop to the two or more pulleys. In one embodiment, the belt is made of transparent layers. The conveyor belt 104 may be placed in contact with a surface of the fluid 114 in the conduit 112. The position of the conveyor belt 104 is such that it may be parallel to the first reference axis (not shown in FIG. 1) of the conduit 112. The first reference axis (not shown in FIG. 1) is perpendicular to a line that passes through a center of gravity of the depth camera 102 and a center of gravity of the conveyor belt 104.

The indicator ball 106 may be placed in contact with the conveyor belt 104. In one implementation the indicator ball 106 may be red in color. The indicator ball 106 may convey along a third reference axis (not shown in FIG. 1) that is parallel to the second reference axis and passes through the center of gravity of the conveyor belt 104. Here, the third reference axis (not shown in FIG. 1) is along the length of the conduit 112. The third reference axis is explained in further detail in conjunction with FIG. 2.

In one embodiment, the image capturing devices 108 may be Red Green Blue (RGB) cameras. In one implementation, the two image capturing devices 108 may be attached to the inner side of the lid 110 of the conduit 112. The two image capturing devices 108 may be placed at an equal distance from the depth camera 102, to the right and left of the depth camera 102, along a second reference axis (not shown in FIG. 1). The second reference axis (not shown in FIG. 1) may be parallel to the first reference axis (not shown in FIG. 1) and may align the depth camera 102 and the two image capturing devices 108. The two image capturing devices 108 may also be parallel to the first reference axis (not shown in FIG. 1) of the conduit 112. The second reference axis is explained in further detail in conjunction with FIG. 2.

In an implementation, the fluid monitoring device 100, in addition to the components explained herein above, may also comprise two movable arms 118 and at least one light source 116. In one implementation, the movable arms 118 may be made of metal such as, steel. The movable arms 118 may be placed in a center of gravity of two pulleys of the conveyor belt 104. The movable arms 118 may move up and down depending on the position at which the conveyor belt 104 needs to be placed. The position at which the conveyor belt 104 needs to be placed, shall be determined based on the fluid level as determined by the input from the depth camera 102.

The at least one light source 116 may be placed adjacent to the image capturing devices 108. The light sources 116 may be placed to the left and right side of the two image capturing devices 108, along the second reference axis (not shown in FIG. 1).

The fluid monitoring device 100 may further comprise a monitoring unit 120 that monitors the fluid flow in the conduit 112. The monitoring unit 120 executes the processing functions in the fluid monitoring device 100.

Figure 2:
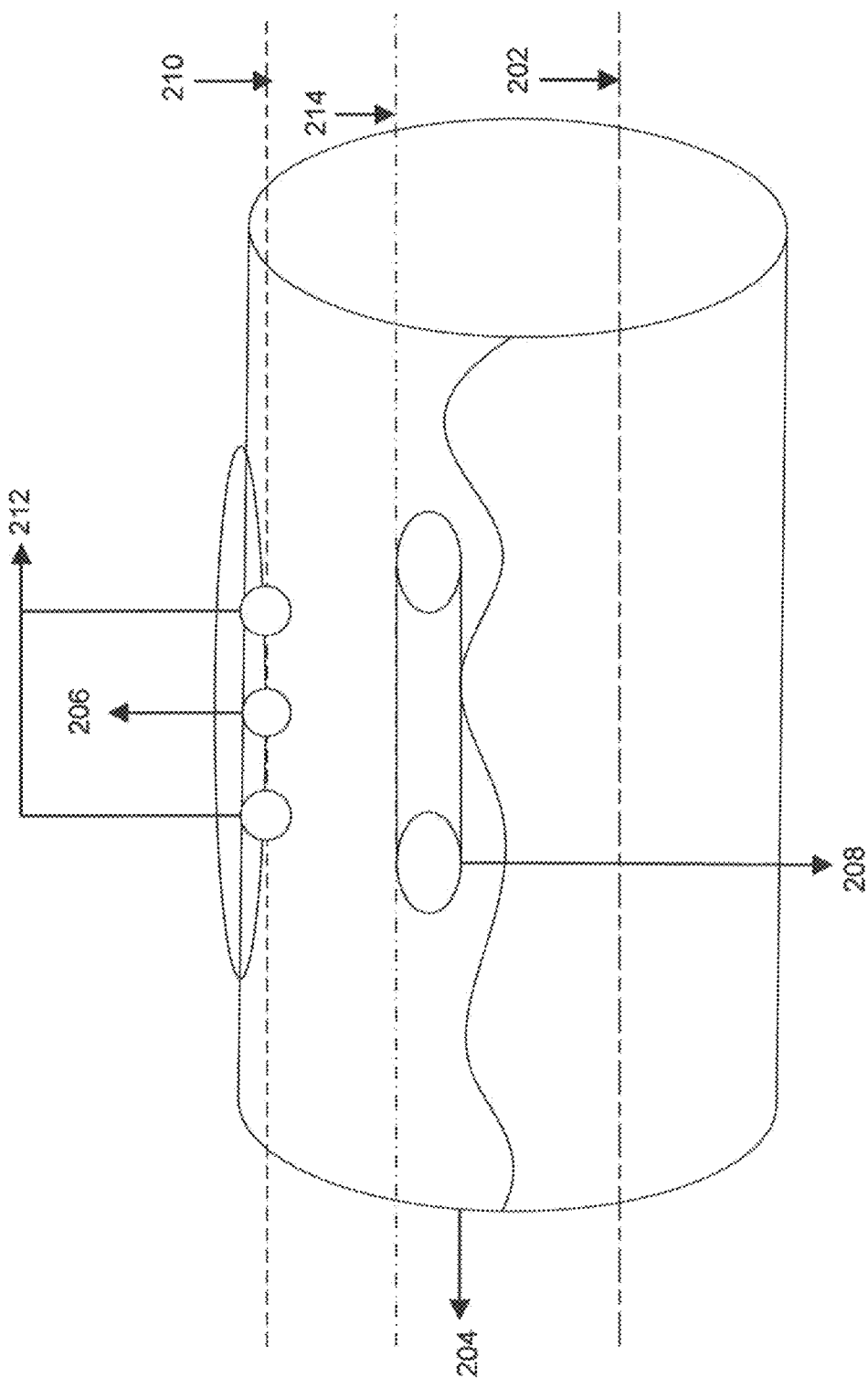
FIG. 2 is a schematic side view of a second exemplary embodiment of the arrangement of the various components of the disclosure indicating reference lines.

FIG. 2 is a schematic side view of a secondary exemplary embodiment of the arrangement of the disclosure indicating reference lines. The first reference axis 202 is an axis that is parallel to length of the conduit 204 and is perpendicular to a line that passes through a center of gravity of a depth camera 206 and a center of gravity of a conveyor belt 208. The second reference axis 210 is parallel to the first reference axis 202. The depth camera 206 and the image capturing devices 212 and the at least one light source 116 is aligned along the second reference axis 210. The third reference axis 214 may align the indicator ball 106 in place. The third reference axis 214 may be dealt with in further detail in FIG. 3.

Figure 3:
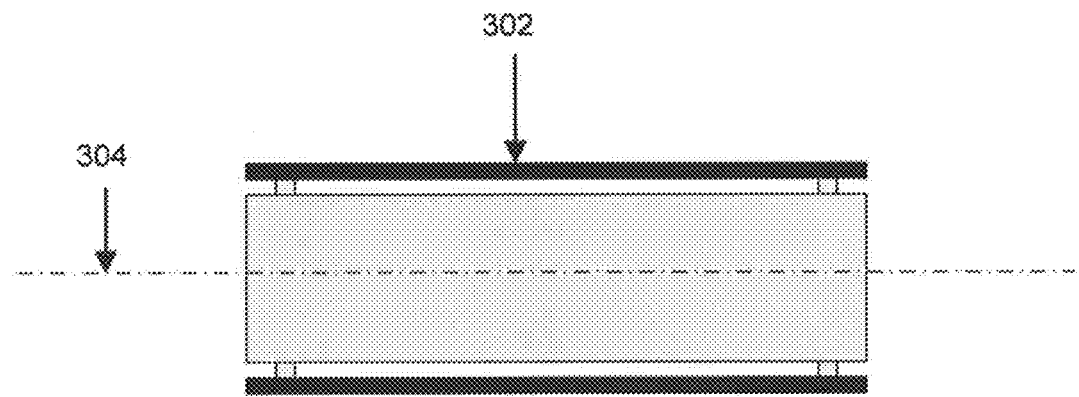
FIG. 3 is a top view of a conveyor belt associated with a fluid monitoring device.

FIG. 3 is a top view of a conveyor belt 302 associated with a fluid monitoring device 100. The third reference axis 304 is parallel to the second reference axis 210. The third reference axis 304 may also pass through the center of gravity of the conveyor belt 302 along a length of the conveyor belt 302. The indicator ball 106 may be placed along the third reference axis 304.

Figure 4:
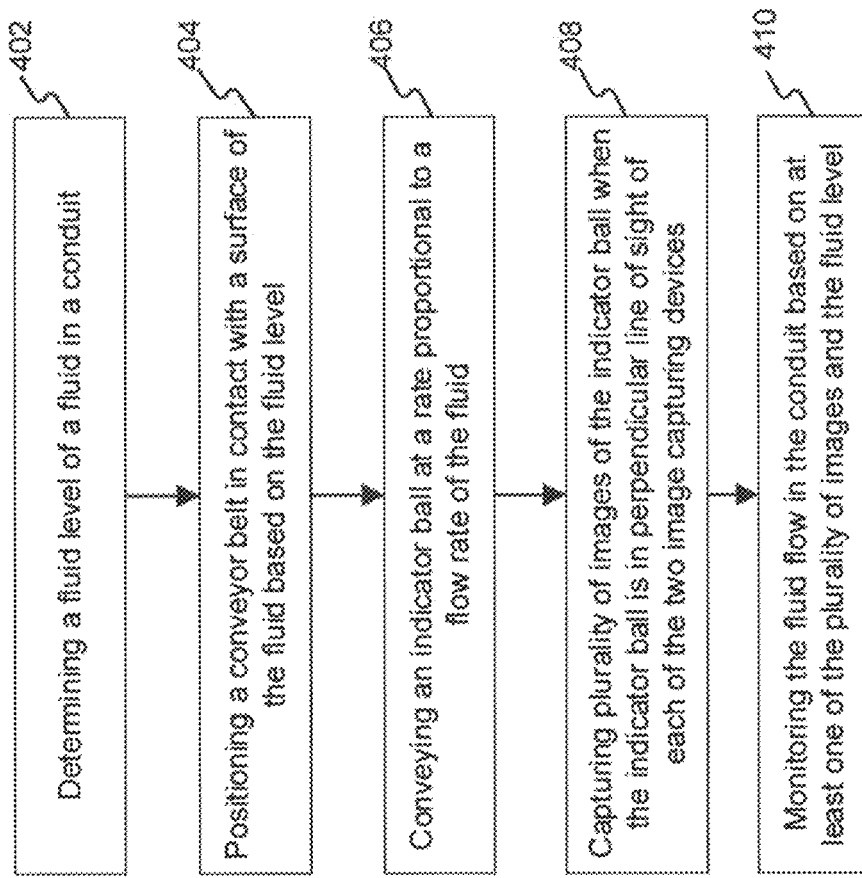
FIG. 4 illustrates a method of monitoring fluid flow in a conduit, in accordance with some embodiments of the present disclosure.

FIG. 4 illustrates a method of monitoring fluid flow in a conduit 112, in accordance with some embodiments of the present disclosure. With reference to FIG. 4, at step 402, fluid level of a fluid 114 in the conduit 112 may be determined. The fluid level may be determined by a depth camera 102. The depth camera 102 may comprise a Red Green Blue camera and an infrared projector. The depth camera 102 may first determine the distance of the lower portion of the conduit 112 from the depth camera 102. Further, the depth camera 102 may determine the distance of the surface of the fluid 114 from the depth camera 102. The fluid level may be determined based on the distance of the lower portion of the conduit 112 from the depth camera 102 and the distance of the surface of the fluid 114 from the depth camera 102.

After determining the fluid level of the fluid 114 in the conduit 112, positioning a conveyor belt 104 in contact with a surface of the fluid 114 is done, at step 404. The exact position where the conveyor belt 104 needs to be placed may be determined using the fluid level. The conveyor belt 104 needs to just touch the surface of the fluid 114. The two movable arms 118 may move the conveyor belt 104 up or down depending on the fluid level. In one embodiment, the two movable arms 118 may place the conveyor belt 104 automatically, after determining the fluid level of the fluid 114.

After positioning the conveyor belt 104 in contact with the surface of the fluid 114, the conveyor belt 104 conveys an indicator ball 106 at a rate proportional to a flow rate of the fluid 114, at step 406. Hence, the indicator ball 106 may be utilized to determine the flow rate of the fluid 114.

When the indicator ball 106 is conveyed at a rate proportional to the flow rate of the fluid 114, plurality of images may be captured by the image capturing devices 108, at step 408. The first image capturing device 108a may capture an image of the indicator ball 106 when the indicator ball 106 is in perpendicular line of sight of the first image capturing device 108*a*, i.e. when the indicator ball 106 is directly below the first image capturing device 108*a*. In one illustration, T1 may be the time at which the first image capturing device 108*a* captures the image of the indicator ball 106. The second image capturing device 108*b* may also capture an image of the indicator ball 106 when the indicator ball 106 is in perpendicular line of sight of the second image capturing device 108*b*, i.e. when the indicator ball 106 is directly below the second image capturing device 108*b*. In one illustration, T2 may be the time at which the second image capturing device 108*b* captures the image of the indicator ball 106.

After capturing the plurality of images of the indicator ball 106, the fluid 114 in the conduit 112 may be monitored by a monitoring unit 120. Monitoring may comprise determining the flow rate of the fluid 114 in the conduit 112 based on the time difference between time at which each of the plurality of images are captured and distance between each of the two image capturing devices 108. In one illustration T2−T1 may be the time difference, based on which the flow rate may be calculated. Monitoring may further comprise determining transferred fluid quantity. The transferred fluid quantity may be based on the flow rate and volume data. The volume data may be determined based on radius of the conduit 112, length of the conduit 112 and the fluid level of the conduit 112. In one embodiment, the transferred fluid quantity may be determined by determining volume data of the fluid 114 in a particular point in the conduit 112. After determining, the volume of the fluid 114, the flow rate at which the fluid 114 is being transferred may be determined. The flow rate and the volume data together may indicate the amount of fluid 114 transferred from that particular point.

Monitoring may further comprise determining presence of blockage in the conduit 112. The presence of blockage may be determined based on at least one of the flow rate and the transferred fluid quantity. In one embodiment, an increased volume of fluid 114 at a particular point and a decrease in the flow rate of the fluid 114 may indicate a presence of blockage in the conduit 112.

Monitoring may further comprise communicating at least one of the flow rate, the transferred fluid quantity or the presence of blockage in the conduit 112 to an external device (not shown in FIG.). The communication of these parameters and statuses may enable a quick repair work. This may avoid the costly interruptions of regular flow of fluid 114 in the conduit 112. The frequency of monitoring shall be possible to be set and the monitoring unit 120 shall perform the monitoring based on the programmed frequency.

In one illustration, the conduit 112 may be a cylinder. The fluid level of the fluid 114 in the cylinder may be determined by a depth camera 102 placed inside the cylinder. In one embodiment, light sources 116 may be used. In another embodiment, night vision camera (not shown in FIG.) may be used. Then the conveyor belt 104 may be placed in contact with the surface of the fluid 114 by the two movable arms 118. The exact position for placing the conveyor belt 104 may be based on the fluid level. After positioning, the conveyor belt 104 may convey, an indicator ball 106 attached to the conveyor belt 104, at a rate proportional to the flow rate of the fluid 114. When the indicator ball 106 reaches a position that is exactly below each of the two image capturing devices 108, then the two image capturing devices 108 captures images of the indicator ball 106. After capturing images, the monitoring unit 120 may determine flow rate of the fluid 114. The flow rate of the fluid 114 may be calculated by using the time difference between time at which each of the plurality of images are captured and the distance between the two image capturing devices 108. The monitoring unit 120 may also determine the transferred fluid quantity based on the flow rate and the volume data. The volume data of the cylinder may be determined using the equation, $$V = LR^2 \cos^{-1}\left(\frac{R-D}{R}\right) - (R-D)\sqrt{2RD - D^2},$$

wherein V represents volume of the cylinder, L represents length of the cylinder, R represents the radius of the cylinder, D represents the fluid level of the cylinder. The cylinder may be monitored for blockage based on the flow rate and the transferred fluid quantity.

What is claimed is:
1. A fluid monitoring device in a conduit, the fluid monitoring device comprising:
 a depth camera placed inside the conduit, wherein the conduit has a first reference axis parallel to length of the conduit;
 a conveyor belt placed in contact with a surface of a fluid in the conduit, wherein the conveyor belt is placed parallel to the first reference axis of the conduit, and wherein the first reference axis is perpendicular to a line that passes through a center of gravity of the depth camera and a center of gravity of the conveyor belt;
 an indicator ball placed in contact with the conveyor belt; and
 two image capturing devices placed inside the conduit, wherein the two image capturing devices are parallel to the first reference axis of the conduit, and wherein each of the two image capturing devices are placed at an equal distance from the depth camera.
2. The fluid monitoring device as claimed in claim 1, wherein the depth camera and each of the two image capturing devices are aligned along a second reference axis that is parallel to the first reference axis of the conduit.
3. The fluid monitoring device as claimed in claim 1, wherein the indicator ball travels along a third reference axis, wherein the third reference axis is parallel to the second reference axis and passes through the center of gravity of the conveyor belt along the length of the conduit.
4. The fluid monitoring device as claimed in claim 1, further comprises two movable arms, wherein each of the two movable arms is placed in a center of gravity of two pulleys of the conveyor belt.
5. The fluid monitoring device as claimed in claim 1, further comprises at least one light source placed adjacent to the two image capturing devices.
6. A method of monitoring fluid flow in a conduit, the method comprising:
 determining, by a depth camera, a fluid level of a fluid in the conduit;
 positioning, by two movable arms, a conveyor belt in contact with a surface of the fluid based on the fluid level;
 conveying, by the conveyor belt, an indicator ball at a rate proportional to a flow rate of the fluid;
 capturing, by two image capturing devices, plurality of images of the indicator ball when the indicator ball is in perpendicular line of sight of each of the two image capturing devices; and monitoring, by a fluid monitoring device, the fluid flow in the conduit based on at least one of the plurality of images and the fluid level.

7. The method as claimed in claim 6, wherein monitoring the fluid flow comprises determining the flow rate of the fluid in the conduit based on each of the plurality of images.

8. The method as claimed in claim 7, wherein determining the flow rate comprises:
   determining time difference between time at which each of the plurality of images are captured; and
   determining the flow rate based on the time difference and distance between the two image capturing devices.

9. The method as claimed in claim 7, wherein monitoring the fluid flow further comprises determining transferred fluid quantity based on the flow rate and volume data of the conduit.

10. The method as claimed in claim 9, wherein the volume data is determined based on radius of the conduit, length of the conduit, and fluid level of the conduit.

11. The method as claimed in claim 9, wherein monitoring the fluid flow further comprises determining presence of blockage inside the conduit based on at least one of the flow rate and the transferred fluid quantity.

12. The method as claimed in claim 11, wherein monitoring the fluid flow further comprises communicating at least one of the flow rate, the transferred fluid quantity or the presence of blockage to external devices.

13. The method as claimed in claim 6, further comprises illuminating inward side of the conduit by at least one light source.

* * * * *